United States Patent [19]

Takabayashi

[11] 3,824,654

[45] July 23, 1974

[54] CONNECTOR OR AN ADJUSTER

[75] Inventor: Teruo Takabayashi, Kyoto, Japan

[73] Assignee: Korin Limited, Kyoto, Japan

[22] Filed: Aug. 28, 1972

[21] Appl. No.: 284,255

[30] Foreign Application Priority Data
Dec. 27, 1971  Japan.................................. 46-1518

[52] U.S. Cl. .............. 24/198, 24/73 LF, 24/255 SL
[51] Int. Cl. ...................... A44b 21/00, A44b 11/00
[58] Field of Search................. 223/DIG. 1, DIG. 2;
85/5 R; 24/248 SL, 255 SL, 248 HC, 249 SL,
255 BC, 255 H, 73 P, 73 PF, 73 LF, 79, 107,
16 R, 245 FF, 259 A, 243 GC, 201 S, 230
SL, 137 A, 206 A, 208 A, 186, 198

[56] References Cited
UNITED STATES PATENTS

| 293,831 | 2/1884 | Wickers ..................... 24/206 A UX |
| 460,066 | 9/1891 | Bell.................................. 24/186 X |
| 1,628,962 | 5/1927 | Fletcher............................ 24/73 LF |
| 2,703,444 | 3/1955 | Proth ............................ 24/137 A X |
| 2,818,871 | 1/1958 | Beaudry........................ 24/255 H X |
| 2,897,825 | 8/1959 | Wagner.......................... 24/255 H X |
| 3,135,034 | 6/1964 | Fauteux ........................ 24/137 A |
| 3,317,968 | 5/1967 | Plastock .................. 24/255 SL UX |
| 3,526,935 | 9/1970 | Boyce et al. ................. 24/255 SL X |
| 3,755,859 | 9/1973 | Solari .............................. 24/255 SL |

FOREIGN PATENTS OR APPLICATIONS

| 28,851 | 8/1964 | Germany.......................... 24/255 SL |
| 651,186 | 3/1951 | Great Britain ..................... 24/137 A |
| 95,830 | 8/1922 | Switzerland...................... 24/137 A |

Primary Examiner—Donald A. Griffin

[57] ABSTRACT

The present invention relates to a connector or an adjuster such as buckles, fasteners and the like comprising a first plate member, a second plate member, a pivotal member for connecting the plate members to each other and for governing the opening and closing movements of said plate members, and a locking means for immobilizing the closed condition of both plate members, and said members and means are molded integrally of plastic material.

1 Claim, 11 Drawing Figures

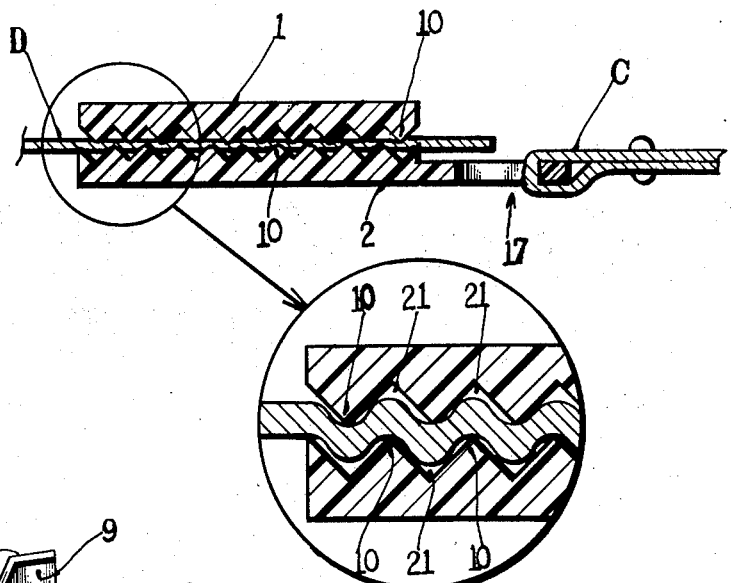
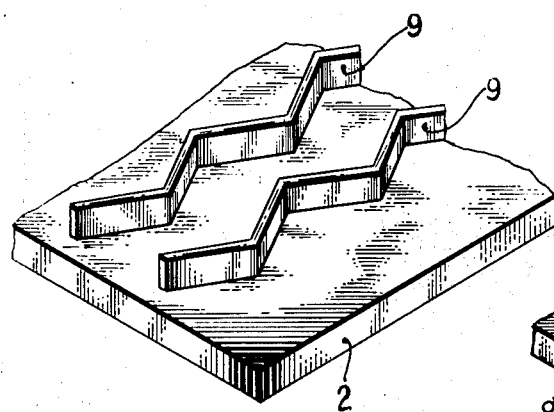
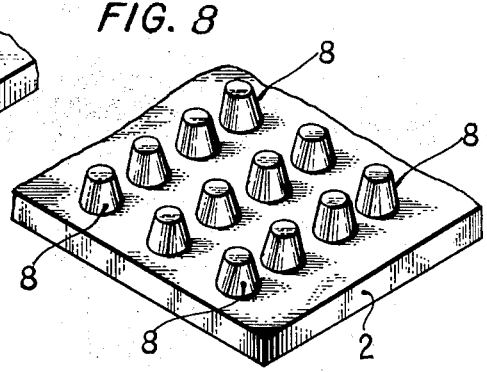
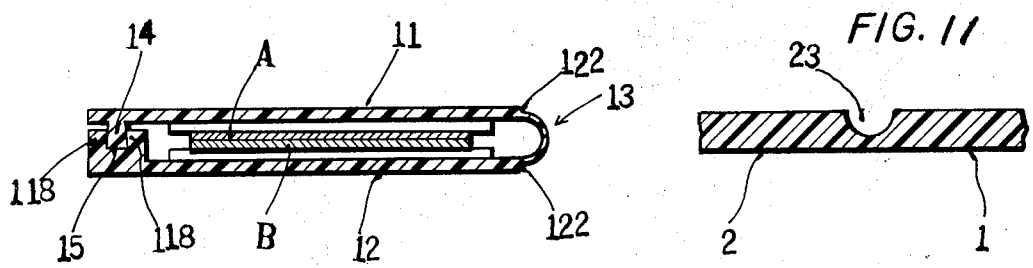

CONNECTOR OR AN ADJUSTER

The present invention relates to a connector or an adjuster such as buckles, fasteners and the like for adjusting length of belts to be worn on trousers, skirts, women's garments and others, bands for suspenders or braces and bands for shoes and headwears, and for fastening securely loose ends of such belts and bands.

Various types of buckles have been used heretofore. The conventional types of buckles comprise, for example, a frame (a part of the frame being connected to one end of the bands or belts) of rectangular, oval or other shape, and a catch whose one end is rotatably pivoted to a suitable end of said frame and the other end of the catch is inserted selectively into one of a plurality of holes punched in the bands or belts to adjust the length of the bands or belts.

The disadvantages of such conventional buckles are that, at the time of adjusting the length of the bands or belts, turning of the catch as well as insertion of the one end of the catch into said holes are troublesome, besides the fact that at least two or more holes are necessary to be punched in the bands or belts for adjusting the suitable length thereof. Further, since most of the conventional buckles are made of metal, the bands or belts apt to damage easily. Furthermore, the metal buckles are often found to be unacceptable by wearers due to their peculiar weightiness, rigidity and coolness. The main object of the present invention is, therefore, to obviate the above-mentioned disadvantages of the conventional buckles and to provide a buckle of an improved design and construction.

Another important object of the present invention is to provide a connector or an adjuster which is integrally formed of a plastic material and which can be manufactured simply, easily and inexpensively.

In order to achieve these objects, the present invention provides a plastic buckle comprising a first plate member, a second plate member, a pivotal member for connecting these plates one to the other and for governing the opening and closing of these plate members, and a locking means for holding these plate members in their closed condition. It further provides a buckle wherein an antiskid means is provided on the inner surface of one of the plate members. Furthermore, the present invention is to provide a buckle wherein each of said members is integrally molded of a plastic material.

Said plastic material to be used for molding said members of the buckle according to the present invention is preferably selected from pliable plastics such as polypropylene, polyvinyl chloride or the like.

The buckle of the present invention thus molded of the plastics is much more superior to the conventional metal buckles in respect of its mechanical strength, smoothness degree of its surfaces, its resilience and feeling.

Further, the buckle of the present invention can be manufactured on mass-production basis by means of injection molding or the like, whereby its manufacturing cost is considerably reduced.

Furthermore, the construction of the buckle of the present invention can be simplified by utilizing the excellent resilience peculiar to the plastics, thus the operation of the buckle can be carried out extremely handily and rapidly.

Besides, the buckle of the present invention can exhibit fastening effect better than that of the conventional buckles and the band or belt fixed with said buckle is much more comfortable to wear than the band or belt with the conventional type buckle.

So far an application of the present invention to the buckle has been elucidated, however, the article according to the present invention can also be used as a connector or a clip for suspenders or braces, as a laundry clip for fastening laundered underwears and clothing to a clothes line, or as a fastener, a connector or an adjuster for other uses, and the article according to the present invention is widely useful.

Other features and advantages of the present invention will be apparent from the following detailed description accompanied by the attached drawings in which:

FIG. 7 is an enlarged explanatory sectional view of the buckle shown in FIG. 2, wherein the buckle is shown how it is used with a band or belt;

FIG. 8 is a partial enlarged perspective view of a first modification of an antiskid member of the buckle according to the present invention;

FIG. 9 is a partial enlarged perspective view of a second modification of the antiskid member of the buckle according to the present invention;

FIG. 10 is a sectional view of the fastener shown in FIG. 4, wherein the plate members are shown in closed condition; and FIG. 11 is a partial enlarged sectional view of a modification of a pivotal member of the buckle according to the present invention.

Figure 1:
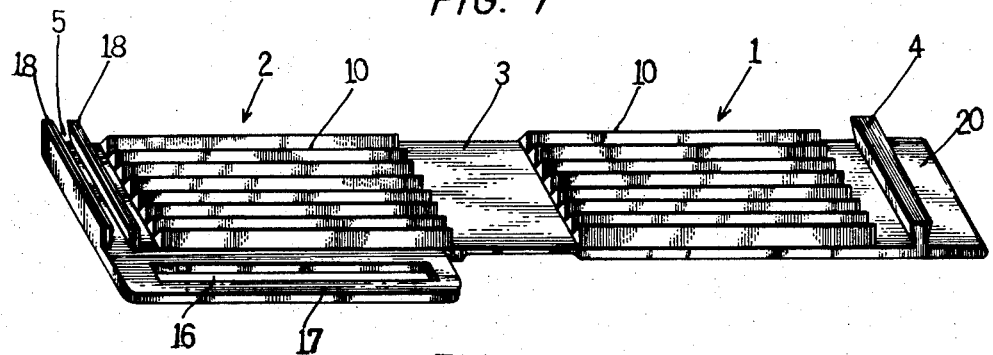
FIG. 1 is a perspective view of a buckle according to the present invention.
Figure 2:
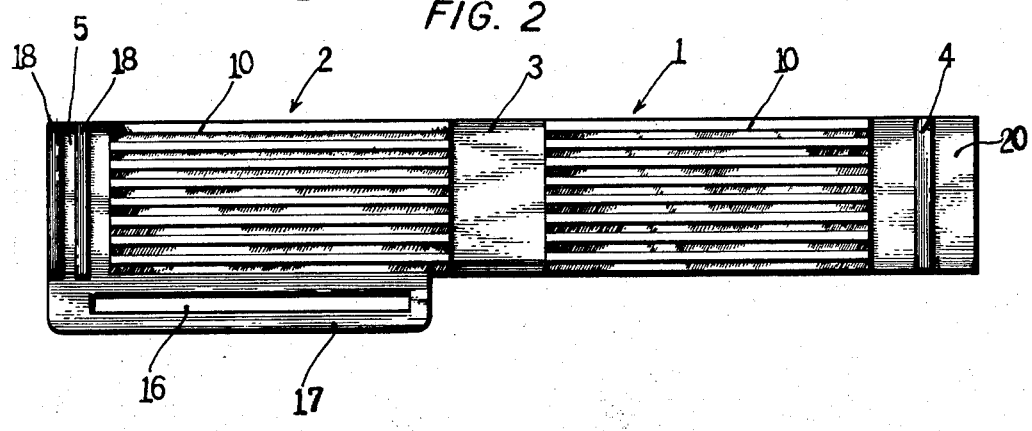
FIG. 2 is a plan view of the buckle according to the present invention.
Figure 3:
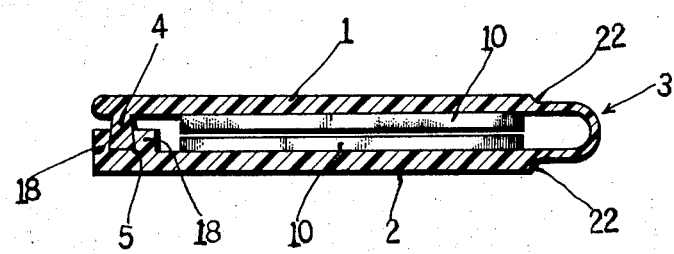
FIG. 3 is a sectional view of the buckle of the present invention, wherein the plate members are shown in their closed condition.
Figure 5:
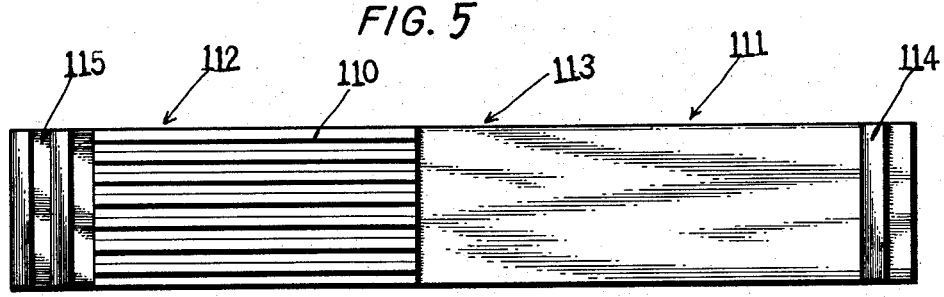
FIG. 5 is a plan view of a first modification of the fastener according to the present invention.
Figure 6:
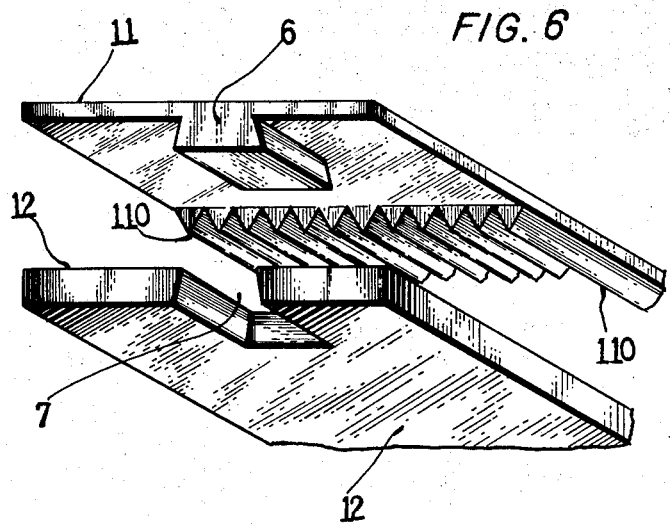
FIG. 6 is a partial perspective view of a modification of a locking means of the buckle according to the present invention.

Referring now to the drawings, numerals 1 and 2 represent a first plate member and a second plate member, respectively, said first and second plate members being integrally connected to each other by means of a pivotal member 3. These members are molded integrally of a plastic material. Said pivotal member is bendable and is formed thinner than the first plate member 1 or the second plate member 2 through offset portions 22, 22 for facilitating bending. Numerals 4 and 5 represent a fitting ridge and a channel for receiving the ridge, respectively, and said ridge 4 and channel 5 functionate as a locking means when the ridge is fitted into the channel. As shown in FIG. 1, the ridge 4 and the channel 5 are provided respectively at the outer end portion of the plate members 1 and 2 perpendicularly intersecting the longitudinal direction of said plate members. The ridge 4 and the channel 5 should be disposed in such a way that, when the first plate member and the second plate member are bent through the pivotal member 3 so as to overlap one another (closed condition), the ridge 4 and the channel 5 are positioned correspondingly to each other. Said ridge 4 and channel 5 can, however, be disposed in other directions than that shown above, that is, the direction perpendicularly intersecting the longitudinal direction of the plate members 1 and 2. In other words, they may be disposed in any direction as far as they can lock together the plate members 1 and 2. Furhter, the ridge 4 and the channel 5 may be formed in any other shape than that shown in FIGS. 1 to 5. Any shape or construction of the locking means is applicable to the buckle of the present invention provided however that it is capable of locking the plate members together. One of such locking means is shown in FIG. 6 wherein a trapezoid projection 6 and a correspondingly shaped notch 7 into which the projection 6 can be fitted tightly are shown provided on the member 11 and in the member 12, respectively. An antiskid means is provided on the inner surface of each of the plate members 1 and 2 (FIGS. 1, 2 and 3), or on the inner surface of either one of the plate members (FIG. 5). In FIGS. 1, 2 and 3 the antiskid means is provided on the inner surface of each of the plate members, said antiskid means comprising a plurality of ridges 10 having a triangular cross section and formed along the longitudinal direction of the plate members. The antiskid means may, however, be of any construction that possesses the antiskid effect. One of such examples is a plurality of frustoconical projection 8 shown in FIG. 8, or a plurality of zigzag ridges 9 shown in FIG. 9. Said antiskid means is for preventing the sliding action to be caused between the outer surface of the band, belt or string inserted between both plate members in the closed condition at the time the buckle of the present invention is in use, and the surface of the plate members being in contact with said outer surface. Thus, the antiskid means may be of any type regardless of shape and material if the above-mentioned object for preventing the sliding action can be achieved. Further, as another example of the antiskid means, although not shown in the drawings, a separately formed antiskid sheet member full of frictional force may be pasted on the inner surface of each of the plate members or on the inner surface of either one of the plate members.

The first plate member 1, the second plate member 2, the pivotal member 3 and the locking means may be molded integrally of plastic material such as polypropylene, polyvinyl chloride or the like employing injection molding or other suitable moldings. The antiskid means is also molded integrally with said means and members except said antiskid sheet member which is not integrally molded with said means and members.

It is particularly to be noted that the pivotal member 3 which governs the opening and closing movements of the first plate member 1 and the second plate member 2 utilizes the resilience of the plastic material, and functionates as a shaft and bearing of this type of conventional device even though the construction of the pivotal member 3 is greatly simpler than that of the shaft and bearing of the conventional type device.

Said pivotal member 3 may be molded somewhat thinner than each of the plate members to enhance its bending action. The pivotal member may also be of a notch 23 having a circular arc shape when sectional as shown in FIG. 11.

As shown in FIGS. 1 and 2, a connecting means 17 possessing an insertion opening 16 may be molded integrally with one of the plate members, for example, the plate member 2 extending from the end portion of either one of the plate members, for example, the plate member 2, said end portion being the one where the locking means is not provided.

Figure 4:
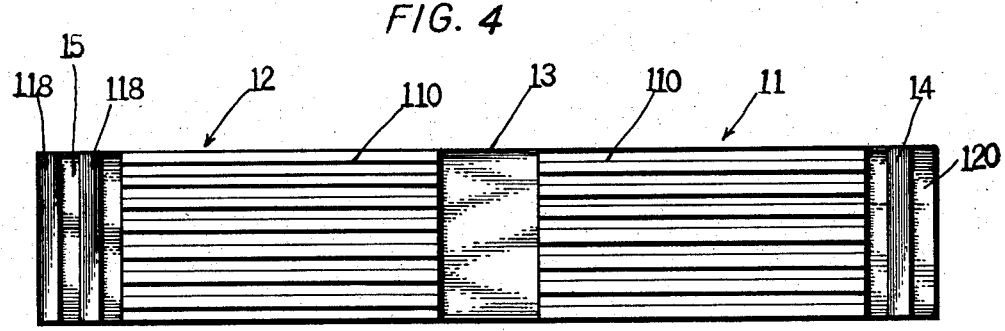
FIG. 4 is a plan view of a fastener according to the present invention.

When the above-mentioned construction of the buckle is applied to a fastener, for example, as shown in FIG. 4, both ends of an object such as a band or fastening ends of two articles such as two strings A and B are fastened between plate members 11 and 12 of the fastener, and both plate members are closed by means of a pivotal member 13 possessing offset portions 122, 122 (see FIG. 10). Locking of both plate members 11 and 12 is performed by forcing a fitting ridge 14 into a channel 15.

The fitting ridge 14 of the locking means may be molded in trapezoid shape when viewed sectionally, and the channel 15 may be formed between vertically projecting walls 118, 118 extending integrally upward from the member 12, said channel 15 being formed in conformity with the shape of the fitting ridge 14. The ridge 14 and the channel 15 are thus formed so that the former fits tightly into the latter, and after the ridge is pressed into the channel, the ridge is not likely to move within the channel or become disengaged therewith, whereby the locking of both members 11 and 12 is obtained stably. An extended end portion 120 may be formed from the end portion of the member 11 so that, when the ridge is to be removed forcedly out of the channel, it can be facilitated by means of said extended end portion 120. Otherwise, one end of the ridge may be laid upon one end of the channel and the ridge may be pressed transversely so that it can slide into the channel. The ridge can be removed from the channel when this operation is followed reversely.

In the fastener wherein both plate members 11 and 12 are locked together as described above, whereby each of ridges 110 of the antiskid means of both plate members 11 and 12 contacts closely the surface of the article held between both members 11 and 12, the portion to be fastened of the article is prevented from removing from the required portion between the plate members 11 and 12, thus the antiskid effect of the required portion of the article is enhanced. As described above, the construction of the antiskid means can be modified in many ways, and one of the modifications is shown in the encircled partially enlarged view of FIG. 7 wherein the ridges 10 of the member 2 are formed in such a way that the ridges face grooves 21 positioned between the adjacent ridges of the member 1 when the plate members are locked together. Another modification is shown in FIG. 8 wherein each of the frustoconical projections 8 formed on one of the plate members is molded so as to face each of recesses positioned between the adjacent projections of the other plate member when the plate members are locked together. A further modification is shown in FIG. 9 wherein each of the zigzag ridges 9 formed on one of the plate members is molded so as to face each of recesses positioned between the adjacent ridges of the other plate member when the plate members are locked together. In fact, the above described construction is not an important characteristic of the present invention, and if desired, both plate members can be of the same construction. In such construction the ridges 10 of the plate member 2 face the ridges 10 of the plate member 1, or the projections 8 or the ridges 9 of one of the plate members face the projections 8 or the ridges 9 of the other plate member when both plate members are locked together.

When the buckle of the present invention is to be used as buckle itself, one end of a band C is passed through the insertion opening 16 and secured to the connecting means 17 as shown in FIG. 7. Then the other end D of the band is held between both plate members 1 and 2 after which both plate members are closed and locked by means of the locking means comprising the fitting ridge 4 and the channel 5. The rest of operation is same as that described above in relation to the fastener.

Since the buckle or the fastener of the present invention is molded integrally of the plastic material as described before, it can be manufactured on a mass production basis and can be made in smaller size or lighter weight than the conventional type metal buckle. Further, its appearance is good and it is quite durable. Furthermore, the operation thereof is simple, whereas two loose ends of the band can be connected readily and rapidly by securing one of the loose ends of the band to the connecting means of the buckle, inserting the other loose end of the band between both plate members of the buckle and closing and locking said plate members by means of the locking means.

The locking by means of the locking means is effected readily and rapidly by pressing the ridge 4, 14 or 114 of the member 1, 11 or 111 into the channel 5, 15 or 115 of the other member 2, 12 or 112, and it is not likely that the ridge thus pressed into the channel comes off therefrom. Further, the ridge 4, 14 or 114 can be removed from the channel 5, 15 or 115 by means of the extended end portion 20 or 120, whereby both plate members 1 and 2, 11 and 12 or 111 and 112 can be opened, and the length of band can thus be adjusted or the band can thus be unfastened.

Furthermore, said other end of the band held between the plate members 1 and 2, 11 and 12 or 111 and 112 is prevented from moving from the required position between said plate members by means of the antiskid means 10, 110, 8 or 9.

In the buckle of the present invention the pivotal member 3 can be formed merely by making it thinner than both of the plate members or one of the plate member, thus the construction thereof is extremely simple, and because of the inherent flexibility possessed by the plastic material said pivotal member is easily bendable, which facilitates the opening and closing of both plate members.

What I claim is:

1. In a connector formed of integrally molded plastic having a first plate portion, a second plate portion, the first and second plate portions having parallel longitudinally extending side edges and a pivotal portion interconnecting the plate portions, said pivotal portion being thinner than each of the plate portions to facilitate bending of the pivotal portion into overlying relationship, the improvement comprising:
   a. locking means for locking the plate portions in an overlying relationship, said locking means consisting of an elongated projection on the first plate portion and a recessed portion on the second plate portion, the projection having a reverse trapezoidal shape in transverse cross-section and extending transversely between the side edges of the first plate portion, the recessed portion being formed by a pair of parallel spaced-apart ridges which transversely extend between the side edges of the second plate portion, the projection being adapted to be pressed into the recessed portion when the plate portions are brought into overlying relationship,
   b. antiskid means on the inner face of each of the plate portions, said antiskid means comprising a plurality of parallel spaced-apart ridges extending parallel to the longitudinal side edges of the plate portions, and
   c. connecting means on one side of one of the plate portions provided with a slot therethrough whereby strap means may be connected to the connection.

* * * * *